3,212,386
BATON
Donald L. Sartell, 328 Seminole Road, Janesville, Wis.
Filed Sept. 4, 1964, Ser. No. 394,565
7 Claims. (Cl. 84—477)

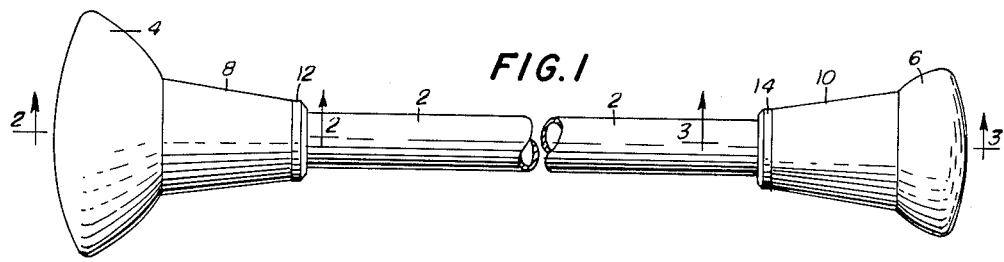
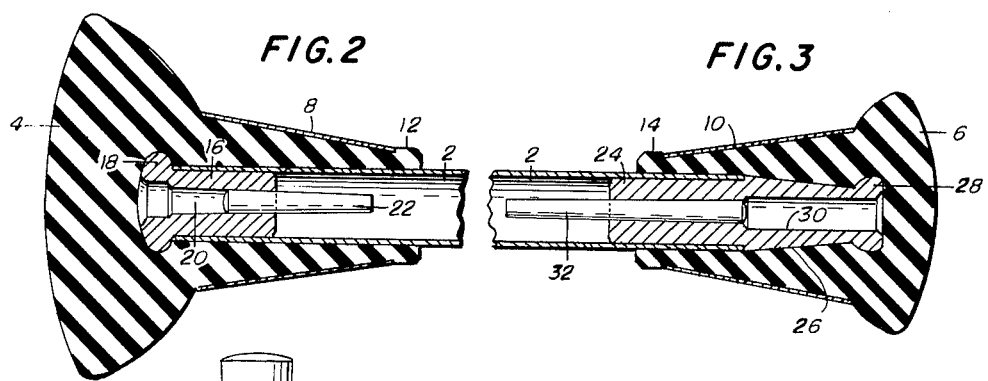
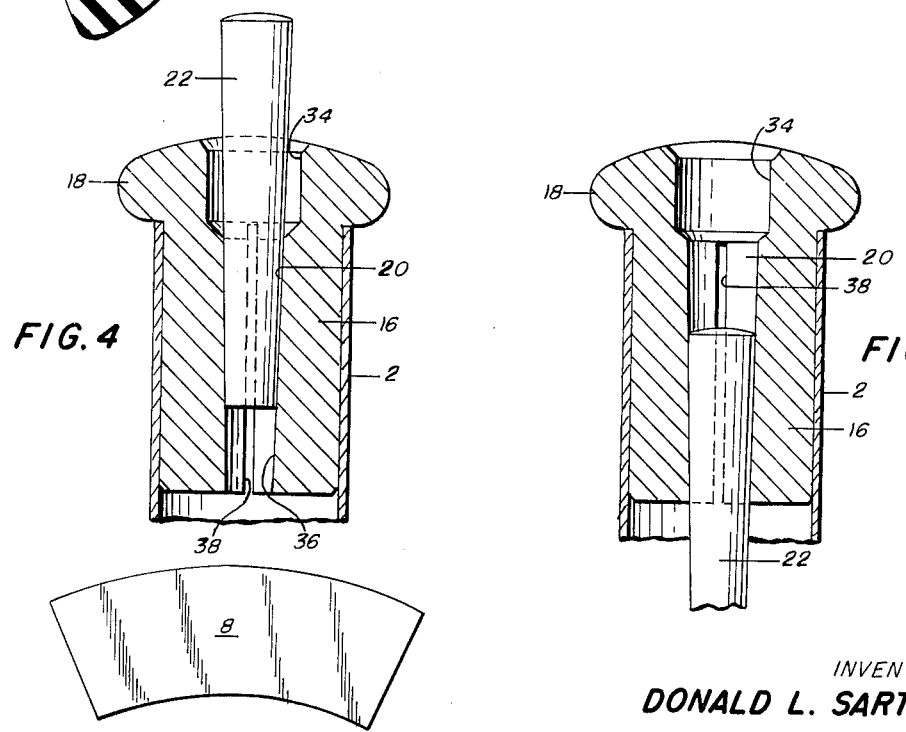
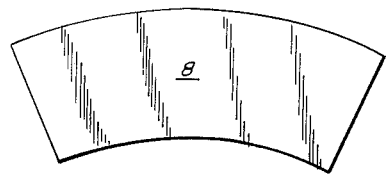

The invention relates to twirling batons of the type used by drum majorettes who perform either marching bands or independently in twirling demonstrations or contests.

Characteristically, these batons comprise a shaft with balls mounted on both ends thereof. Usually the balls are made of rubber or some other elastomeric organic polymer. During the execution of various twirling stunts, the batons are bounced or dropped on their ends. The impact produced by dropping naturally tends to drive the shaft through the ball. After repeated usage, the balls will be broken and must replaced.

Another shortcoming of prior art twirling batons is in the methods of and structure for applying weights to the ends of the shafts and attaching the shaft to the balls. The weights are necessary to increase the moment of inertia of the baton to provide for proper twirling action, and to balance the baton by adding some additional weight to the end of the shaft which carries the small ball. The common practice at present is to force a lead weight into the end of the tubular shaft and to glue the weight in place. This is an inconvenient, time-comsuming step of manufacture and it often produces a poor joint which enables the weight to become loose after the baton is subjected to the abuses of normal use.

This invention contemplates a new type of weight which locks securely in the shaft, and which serves to hold the shaft securely to the ball. The weight disclosed herein cooperates with the ball configuration to securely hold the ball to the baton shaft.

The balls of most batons now in use are composed entirely of curved surfaces which are deformed when the shaft is inserted therein. These are incapable of being covered with sheets of decorative materials. This deficiency, too, is remedied by the ball of the present invention.

One object of this invention is to produce a joint between a baton ball and shaft wherein the impact forces produced by dropping the baton will have a lesser tendency to injure the ball than in prior art batons.

Another object is to provide a secure joint between the shaft and the weights located at the ends of the shaft. Moreover, the weight may itself be the element constructed to securely lock the shaft to the ball.

Still another object is to provide a baton ball which is constructed so that it may be readily ornamented with sheets of decorative materials which enhance its appearance and may represent school colors or blend with any motif.

These and other objects are realized by the baton shown and described herein and which, in the illustrated embodiment, includes a hollow shaft with weights located at both ends thereof. Each weight has a longitudinal bore extending therethrough, and includes a longitudinally slit portion located within the shaft. The longitudinally slit portion is expanded radially outwardly by a wedge to lock within the shaft. Each weight also has a radially enlarged portion lying outside the shaft end, which seats securely within an area of enlarged diameter in the bore of the ball. The outermost end of the weight lies substantially against the innermost end of the ball bore, and an air cushion is located at the outermost end of the weight. This air cushion protects the ball from damage due to repeated impacts. The shaft and weight fit within the ball so that there is no appreciable distortion of the ball. An outer surface of the ball is conical and it may have sheets of decorative and ornamented material wrapped therearound and secured adhesively thereto. These sheets, when flat, are in the shape of a segment of an annulus.

One form which the invention may assume is set forth in the following description and the drawings wherein:

FIG. 1 is a partially fragmentary view of the assembled baton, including the shaft and both balls;

FIG. 2 is a sectional view of the large ball taken along line 2—2 in FIG. 1 and showing the details of assembly of the ball, weight and shaft;

FIG. 3 is a sectional view of the small ball taken along line 3—3 in FIG. 1, and showing details similar to those of FIG. 2;

FIGS. 4 and 5 depict the steps of locking the weight into the baton shaft; and

FIG. 6 shows the shape of a sheet of material which may be used to ornament the baton balls.

The baton of this invention is conventional in that it includes a shaft 2 with a large ball 4 at one end and a small ball 6 at the opposite end. The balls which are illustrated possess a particular streamlined ornamental appearance which I have designed, and include a portion in the shape of a truncated cone which is covered by similarly shaped sleeves or wrappings 8 and 10. If rigid conical sleeves are used, a small shoulder 12 and 14 of the ball material will assist in securing it in place. The shaft 2 may be of any suitable material, either metal or plastic; and the balls 4 and 6 are of rubber or any other elastomeric material.

In FIG. 2, it will be seen that the bore within the ball has a portion of enlarged diameter at its innermost end. The shaft 2 lies within the ball bore where the bore is of uniform diameter; and a weight attached to the shaft has a shoulder or enlarged portion 18 which lies at the innermost end of the ball bore, within the portion of enlarged diameter. The weight is securely locked to the shaft so that there may be no substantial axial or longitudinal movement between the ball and the shaft.

The method of attaching the weight to the shaft, and the details of construction of the weight are shown in FIGS. 4 and 5. The weight has a bore extending centrally and longitudinally therethrough including a relatively large diameter bore portion 34 and a tapered small diameter bore portion 36. The degree of taper is exaggerated for purposes of illustration. Throughout the extent of the bore portion 36, the weight is split by a pair of longitudinal slits such as 38.

The weight is placed in the shaft 2, as shown in FIG. 4, with the enlarged weight portion 18 resting on the end of the shaft and the slit tubular portion 16 within the shaft. A taper pin 22 or other suitable wedging means is placed in the weight bore. Next, the pin 22 is driven downwardly to the position shown in FIG. 5. This expands the slit tubular portion 16 of the weight to lock it to the shaft. Also, this produces a pocket 20 within the weight which, as described below, tends to cushion the forces which the ball transmits to the shaft during use.

In present models, this pocket 20 has been about ¾ inch deep overall and 3/16 inch in diameter at portion 34.

The shaft assembly, including the weight and pin 22, may be forced through the ball bore until the enlarged portion 18 of the weight locks into the similarly enlarged portion in the ball bore. This may tend to build up the air pressure within the pocket 20, but it is not certain whether any of this pressure remains for any length of time. It is known, however, that the presence of the air pocket 20 tends to cushion any impacts which the ball receives, and thus the life of the ball is increased. It is important that this pocket be sealed from the interior of the shaft, since experiments have shown that ball life is reduced if the pin 22 is omitted from the assembly. Therefore, it is desirable that the axial recess or pocket 20 of the weight terminates at a point within the weight.

It will be noted that the enlarged portion 18 of the weight has been chamfered and rounded so that no sharp edges tend to cut the interior of the ball.

The weight within the small ball 6 is similar in construction and operation as that described above. Since the small end must carry a greater weight to balance the baton, this weight is longer than that used in the large end. Also the size of the small ball necessitates a smaller enlarged portion 28 on the weight than that described above.

Therefore, the weight for the small ball end has a tapered section 26 which both adds to its weight and connects the slit tubular portion 24 to the radially enlarged portion 28. Other than these modifications, the weight is identical to that used with the large ball. A taper pin 32 is used to expand the slit tubular portion 24 of the weight, and the weight bore and the taper pin provide an air pocket 30 which cushions the blows received by the small ball 6. It will be noted that when speaking of the "enlarged portion," I refer to that portion which is larger than those areas which are closely adjacent thereto.

This particular method of attaching a shaft to a ball differs from the conventional construction where the elasticity of the ball is a primary means for gripping and holding the shaft therewithin. In conventional construction, there is some deformation of the outer surface of the ball. This makes it difficult to attach any type of planar wrap-around decorative materials to the ball.

On the other hand, where there is no substantial deformation of the ball, as in this invention, one may provide a true conical outer surface which is capable of receiving decorative sheets. One such sheet is shown in FIG. 6. It is in the shape of a segment of an annulus, and it may be made of colorful paper or reflective metallic foil. Often, school colors are used. These sheets 8 may be coated with a pressure sensitive adhesive and covered by a protective backing sheet. The ease of changing colors by removing one decorative sheet 8 and applying another is a great convenience to twirlers, and has heretofore been impossible.

From the above, it will be realized that I have produced a baton which differs appreciably from those known in the art, and one which produces far superior results. Only one form of the invention has been described, and it is realized that numerous modifications may be made without appreciably departing from the spirit and scope of the invention. Therefore, I do not intend to be limited to the described embodiment, but to all which lie with the bounds of the following claims.

I claim:

1. A twirling baton comprising, a shaft assembly, a ball member at each end of said shaft assembly, each said ball member having a bore at one end receiving said shaft assembly, said shaft assembly extending substantially to the innermost end of said bore, means holding said shaft assembly within each said ball member to prevent axial movement therebetween, said shaft assembly having a centrally located axial recess only in its end closest to the innermost end of said bore to form an air pocket which cushions a portion of any axial forces imparted to said ball toward said shaft assembly.

2. A twirling baton comprising, a hollow shaft, a ball at each end of said shaft and concentric therewith, each ball having a bore at one end receiving said shaft, each said bore having an area of enlarged diameter at its innermost end, a weight assembly at each end of said shaft and within a said ball, means holding each weight assembly within an end of said shaft, said weight assembly having an enlarged portion engaged within said area of enlarged diameter of said bore, each said weight assembly having an axial recess at its end furthest within said ball and terminating within said weight to provide a relatively small pocket of air which compresses upon the application of an axial impact to said ball to absorb and cushion a portion of an impact.

3. A twirling baton comprising a hollow shaft, a weight at each end of said shaft, each said weight having a longitudinally slit tubular portion projecting into said shaft and a locking portion projecting outside said shaft, wedging means located within said tubular portion to urge said tubular portion radially outwardly to engage frictionally within said shaft, a ball at each end of said shaft, each said ball having a bore receiving said shaft, and means holding said shaft within said bore to prevent axial movement between said ball and said shaft.

4. A twirling baton comprising a hollow shaft, a weight at each end of said shaft, each said weight having a longitudinally slit tubular portion projecting into said shaft and a locking portion projecting outside said shaft, wedging means located within said tubular portion to urge said tubular portion radially outwardly to engage frictionally within said shaft, a ball at each end of said shaft, each said ball having a bore receiving said shaft, and means on said locking portion of said weight for engaging within said bore to prevent axial movement between said ball and said shaft.

5. A twirling baton comprising a hollow shaft, a weight at each end of said shaft, each said weight having a longitudinally slit tubular portion projecting into said shaft and a radially enlarged shoulder projecting outside said shaft, wedging means located within said tubular portion to urge said tubular portion radially outwardly to engage frictionally within said shaft, a ball at each end of said shaft, each said ball having a bore with a portion of enlarged diameter receiving said shaft, said shoulder being located in said enlarged diameter portion within said bore to prevent axial movement between said ball and said shaft.

6. A twirling baton comprising, a shaft, an elastomeric ball at each end of said shaft and concentric therewith, each said ball having a bore at one end for holding said shaft without substantially deforming said ball, a portion of said ball surrounding said bore having a truncated conical outer surface, and a decorative sheet of material having a flat shape of a segment of an annulus, said decorative sheet encircling said conical portion of said ball, and adhesive means securing said decorative sheet to said conical portion of said ball.

7. A twirling baton comprising, a hollow shaft, a pair of weights each located within an end of said shaft and having a radially enlarged portion projecting from said shaft, each said weight having a longitudinally slit portion projecting into said shaft and a bore extending axially therethrough, wedging means located within said longitudinally slit tubular portion to urge it radially to engage frictionally within said shaft, a ball on each end of said shaft, each said ball having a bore capable of holding said shaft and said weight without substantial deformation of said ball, said ball bore having an area of enlarged diameter at its innermost end and receiving said radially enlarged portion of said weight, a pocket between said ball and said weight being defined by the innermost end of said ball bore, said weight bore and said wedge, a portion of said ball surrounding said ball bore having a truncated conical outer surface, and a decorative sheet of thin material having a flat shape of a segment of an annulus, said decorative sheet encircling said conical portion of said ball, and adhesive means securing said decorative sheet encircling said conical portion of said ball, and adhesive means securing said decorative sheet to said conical portion of said ball.

References Cited by the Examiner

UNITED STATES PATENTS

| | | | |
|---|---|---|---|
| 2,092,254 | 9/37 | Leonard | 84—477 |
| 2,162,157 | 6/39 | Clark | 84—477 |
| 2,988,949 | 6/61 | Rohmann | 84—477 |

LEYLAND M. MARTIN, *Primary Examiner.*